(12) United States Patent
Narlo

(10) Patent No.: US 6,250,927 B1
(45) Date of Patent: Jun. 26, 2001

(54) COSMETIC APPLICATION TRAINING SYSTEM

(76) Inventor: Jean Narlo, 1223 Cumberland Rd., Tyler, TX (US) 75703

( * ) Notice: Subject to any disclaimer, the term of this patent is extended or adjusted under 35 U.S.C. 154(b) by 0 days.

(21) Appl. No.: 09/448,892

(22) Filed: Nov. 29, 1999

(51) Int. Cl.[7] .................................................. G09B 19/00
(52) U.S. Cl. ......................... 434/100; 434/99; 446/100; 446/101
(58) Field of Search ................. 434/81, 99, 100, 434/377, 155; 446/321, 337, 338, 100, 101; 132/320, 319, 333; 273/157 A, 157 R

(56) References Cited

U.S. PATENT DOCUMENTS

| | | |
|---|---|---|
| 2,063,561 | 12/1936 | Sofo . |
| 2,168,352 | 8/1939 | Lawry . |
| 2,309,390 | 1/1943 | Grossguth et al. . |
| 2,327,718 * | 8/1943 | Kassler .............................. 273/157 R |
| 2,623,304 | 12/1952 | Watson . |
| 3,181,869 * | 5/1965 | Genin et al. ...................... 273/157 R |
| 3,353,281 | 11/1967 | Schulze . |
| 3,649,024 * | 3/1972 | Katzman ........................... 273/157 R |
| 4,034,485 | 7/1977 | Milutinovich . |
| 4,112,614 | 9/1978 | Clokey . |
| 4,232,334 | 11/1980 | Dyson . |
| 4,259,804 * | 4/1981 | Samuels ............................. 273/157 R |
| 4,842,523 | 6/1989 | Bourdier et al. . |
| 5,090,910 | 2/1992 | Narlo . |
| 5,320,535 | 6/1994 | Min . |
| 5,358,407 * | 10/1994 | Lainer ...................................... 434/94 |
| 5,441,412 * | 8/1995 | Hayles ................................. 434/100 |
| 5,867,588 | 2/1999 | Marquardt . |

FOREIGN PATENT DOCUMENTS

| | | |
|---|---|---|
| 423200 | 1/1935 | (GB) . |
| 465877 | 5/1937 | (GB) . |

* cited by examiner

*Primary Examiner*—Jacob K. Ackun, Jr.
*Assistant Examiner*—Bera B. Miller
(74) *Attorney, Agent, or Firm*—Nixon & Vanderhye P.C.

(57) ABSTRACT

A cosmetic application training system includes a substrate having a facial image thereon, the facial image divided into multiple facial regions; and one or more transparent overlays having outlines of the facial image regions including printed instructions for applying make-up to each of the facial image regions; wherein the substrate is treated to permit application and removal of the make-up directly onto the substrate. Multiple pads with different facial region images are also contemplated, with removable facial region pieces being interchangeable.

8 Claims, 5 Drawing Sheets

COSMETIC APPLICATION TRAINING SYSTEM

TECHNICAL FIELD

This invention relates to a cosmetic application training system, particularly but not exclusively for use by cosmetology students.

BACKGROUND

There are various known devices or arrangements for composing different facial shapes for purposes ranging from cosmetic application training to police identification, and from reconstructive surgery options to theatrical character selection. One such arrangement is disclosed in my own prior U.S. Pat. No. 5,090,910. Other devices and/or methods are disclosed in U.S. Pat. Nos. 5,441,412; 5,358,407; 5,320,535; 4,842,523; 4,232,334; and 4,034,485.

SUMMARY OF THE INVENTION

The present invention provides a comprehensive but easy-to-use cosmetic application training system that includes instructions for applying various kinds of make-up to literally hundreds of different face shapes.

One component of the system is a foam rubber substrate or pad on which a digitally created facial image has been screen-printed. The pad may be stamped by a suitable cutting tool to create several pieces, each corresponding to a particular facial region. The facial regions include the forehead, eyes, nose, lips and jaw lines. Thus, each facial image is composed of five pieces which create a unique face shape.

In the preferred arrangement, five different facial shapes are created in the above described manner on five separate pads, and while the pieces for each region have the same peripheral shape, each has a variation in the image printed thereon. In this way, five different pieces are created for each of the forehead, eyes, nose, lips and jaw line regions. At the same time, all of the pieces for each region are interchangeable by reason of having the same peripheral outlines. The various facial region pieces may be coded on the back side by numbers or other suitable indicia so that the user can re-create the five basic face shapes at any time. On the other hand, by selecting any one of five pieces for each facial region, many different facial images can be created on any or all of the pads.

The other principal component of the system is a transparent overlay. For systems which include five face shapes, there are five such overlays. Each overlay has printed thereon an outline of the five variations of one of the facial regions. In addition, each overlay contains printed instructions for applying make-up to each of the five variations for the particular facial region printed on the overlay. Accordingly, the user may easily locate the facial region outline on the overlay that matches the corresponding facial region piece on the pad, align the overlay outline on the corresponding facial region on the pad, and review the make-up application instructions for that particular facial region. The overlay can then be removed and the make-up applied directly on the selected facial region on the pad. This process is repeated for each of the five facial regions.

The top surface of the substrate (and thus the image surface on all of the interchangeable pieces) is coated with any suitable material that allows make-up to be repeatedly applied and wiped off without damage or degradation to the underlying image or pad.

The invention in its broader aspects thus relates to a cosmetic application training system comprising a substrate having a facial image thereon, the facial image divided into multiple facial regions; and one or more transparent overlays having outlines of the facial image regions and printed instructions for applying make-up to each of the facial image regions; wherein the substrate is treated to permit application and removal of the make-up directly onto the substrate.

In another aspect, the invention relates to a cosmetic application training system comprising at least two substrates having two differently shaped facial images thereon, each facial image divided into multiple facial regions and composed of discrete facial region pieces removable from the substrate; wherein corresponding facial region pieces have identical peripheral shapes such that the facial region pieces of one of the substrates are interchangeable with the facial region pieces of the other of the substrates to thereby enable composition of variations of the two differently shaped facial images on either or both of the substrates; and at least one transparent overlay having printed thereon outlines of one or more of the discrete facial region pieces and printed instructions for applying make-up to corresponding one or more of the discrete facial region pieces.

In still another aspect, the invention relates to a cosmetic training kit comprising:

a) a plurality of pads or substrates, each printed with a different facial image divided into facial regions; each facial region incorporated on a removable facial region piece;

b) a plurality of transparent overlays, each overlay having printed outlines of one facial region taken from the plurality of pads and instructions for applying makeup thereto; and c) a variety of makeup media.

Objects and advantages not mentioned above will become apparent from the detailed description that follows.

BEST MODE FOR CARRYING OUT THE INVENTION

Figure 1:
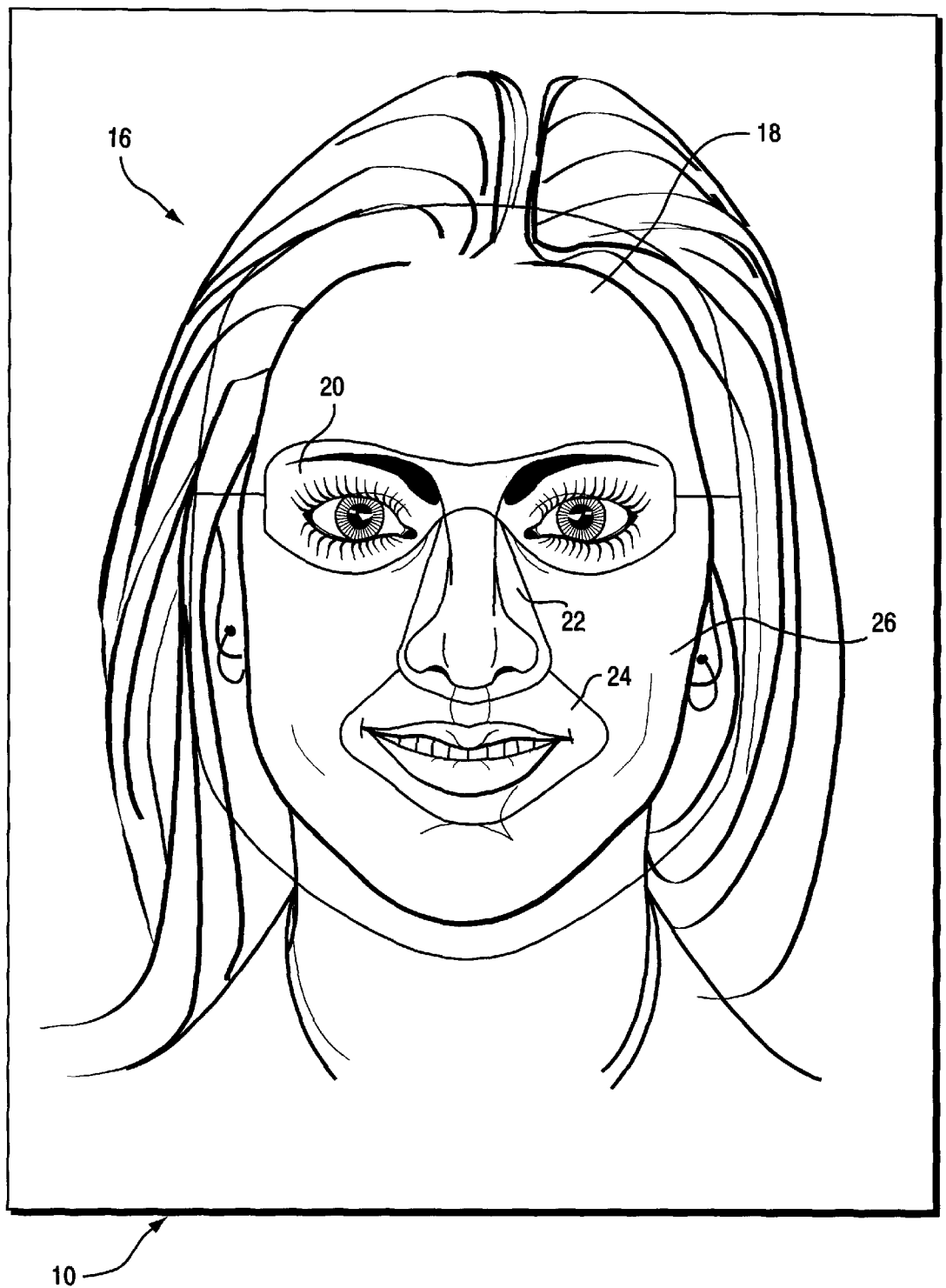
FIG. 1 is a plan view of a substrate or pad printed with a facial image and cut to include multiple pieces for respective facial regions.
Figure 2:
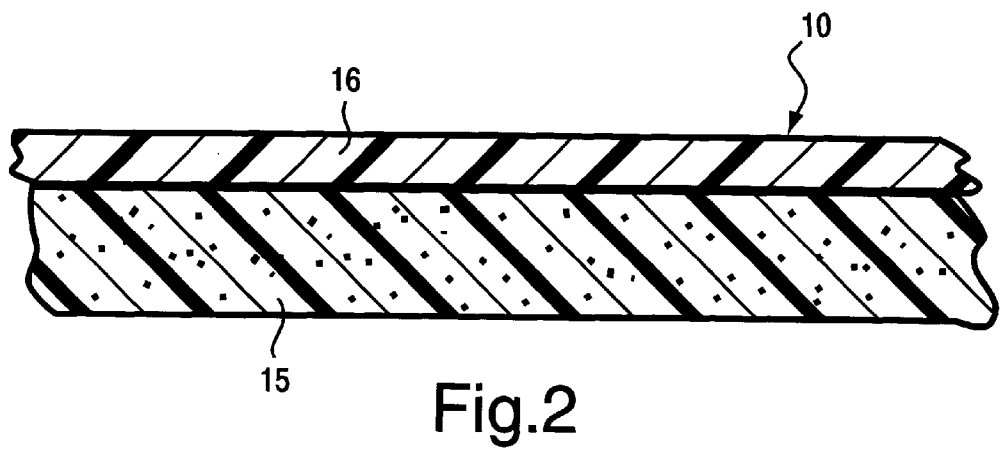
FIG. 2 is a partial cross section of the pad shown in FIG. 1.

With reference to FIGS. 1–4, the major components of the invention include one or more substrates or pads 10, a plurality of overlays 12, 13 etc. and variety of cosmetic products, collectively referred to by numeral 14.

A facial image 16 is applied to the foam rubber pad 10 that is preferably about ⅜" thick, with a length of about 10" and a width of about 8". The dimensions may vary, of course, and are not considered critical. Digital imaging artwork on a diskette is separated into four colors and transferred to a silkscreen that is, in turn, transferred by a conventional screen process onto one face of the rubber pad or sheet 10. For purposes of this invention, the transferred image 16 is that of a female face. Special (but conventional) coatings are applied over the facial image to allow make-up to be repeatedly applied and easily removed from the facial image on the pad. With specific reference to FIG. 2, the underlying foam portion of the pad 10 is shown at 15, while the image 16 is shown with exaggerated thickness simply for clarity.

Figure 5:
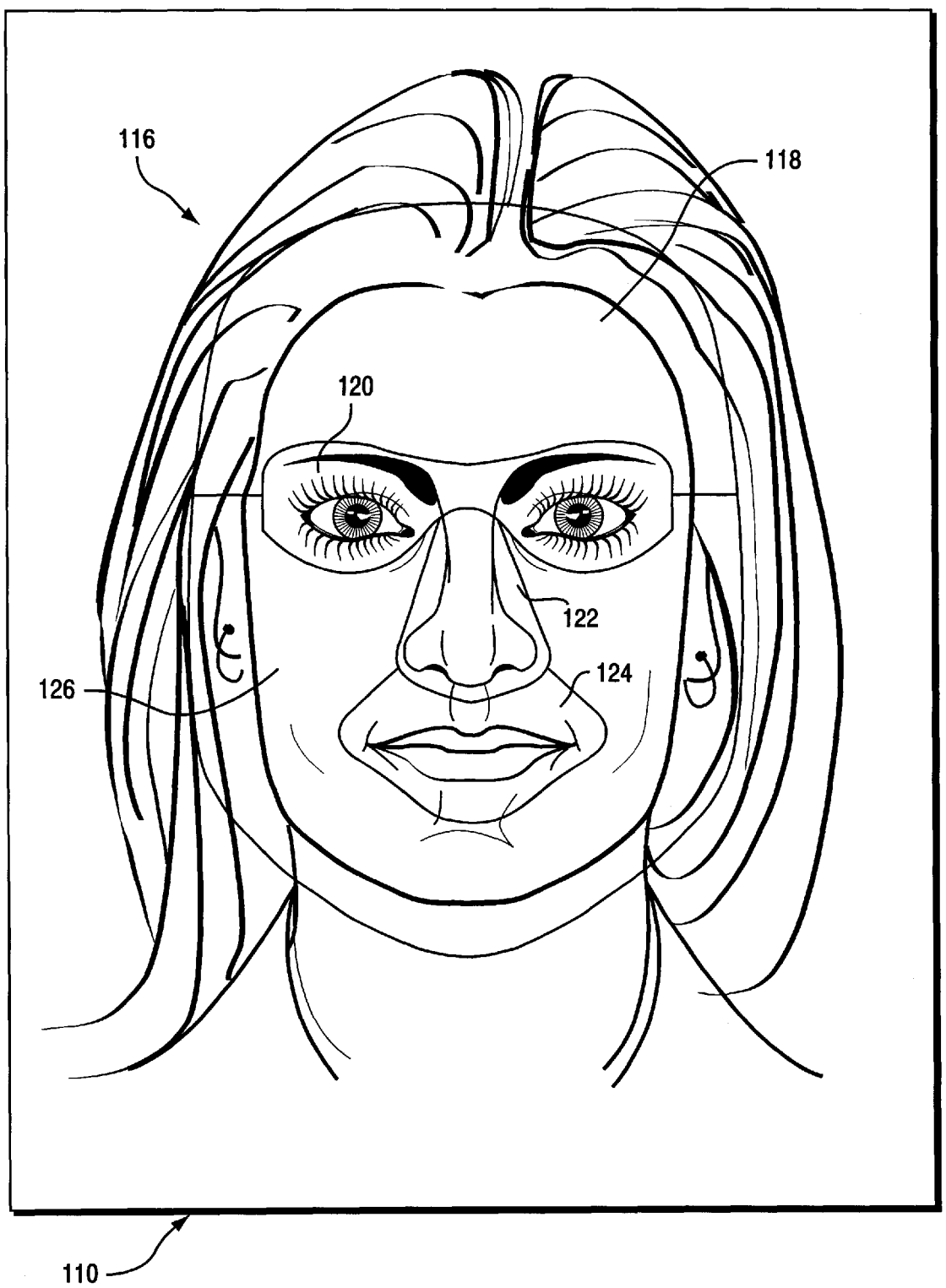
FIG. 5 is an outline of a second pad printed with a second face shape, illustrating the common piece shapes for corresponding facial regions.

In an advantageous arrangement, several facial images 16 are screen printed onto a corresponding number of pads, each facial image incorporating differences in shape in various regions such as foreheads, eyes, noses, lips and jawlines. In a preferred arrangement, five different facial shape images 16 are digitally created on a computer and screenprinted onto five respective pads 10. A second pad 110 with a second facial image 116 is shown in FIG. 5. Additional views of different face shapes are not necessary to fully understand the invention.

Using common stamping or cutting tools, the various facial regions are cut into pieces 18, 20, 22, 24 and 26, so that each corresponding piece has an identical peripheral shape, but with a variation of the facial image thereon. In FIG. 5, similar numerals, but with the prefix "1" added, are used to designate corresponding pieces. Accordingly, with five different facial images on five respective substrates or pads, a total of twenty-five facial region pieces are created, with the corresponding pieces for each region being interchangeable, i.e., the forehead pieces are interchangeable, the eye pieces are interchangeable, etc. In other words, the various facial features can be "mixed and matched" enabling many different facial images to be created on any one or more of the pads 10. Stated in still another way, any one of five different pieces for each facial region (foreheads, jaw lines, eyes, noses and lips) may be "plugged" into one of the substrates or pads in the manner of a puzzle. It should be understood, however, that some of the different face shapes can, at least initially, have identical pieces for certain facial regions. For example, the nose pieces 22, 122 in FIGS. 1 and 5 are identical.

The pieces 18, 20, 22, 24 and 26 may be number coded or otherwise marked with any suitable indicia (preferably on the back side thereof) so that the user can recreate the five basic, original face shapes, and/or to keep track of the various combinations created for instructional purposes. For example, the pieces on one pad may be labeled 1A, 2A, 3A, 4A and 5A, while the pieces on a second pad may be labeled 1B, 2B, 3B, 4B and 5B and so on.

The overlay 12 is preferably a Mylar sheet (or other suitable material) to which five photographic overlay images for one facial region, generally similar to the various interchangeable image pieces on the rubber pad have been applied via conventional means. Thus, overlay 12 in FIG. 3 includes eye images 28, 30, 32, 34 and 36 which correspond to the eye pieces 20, 120, etc. on the five pads 10. The overlay 12 also has instructions indicated at 38, 40 for applying make-up to the different eye images. For purposes of simplicity, overlay 12 is shown to include only two discrete sets of instructions, but it will be appreciated that five separate sets of instructions may be used as necessary. The overlay can be placed atop the image 16, with the particular eye image on the pad matched to the eye image on the overlay. Upon understanding the instructions, the student can remove the overlay 12 and apply make-up directly to the selected region of the facial image on the pad or substrate 10 as instructed. This procedure may be repeated for each facial region until the make-up application is complete.

Figure 4:
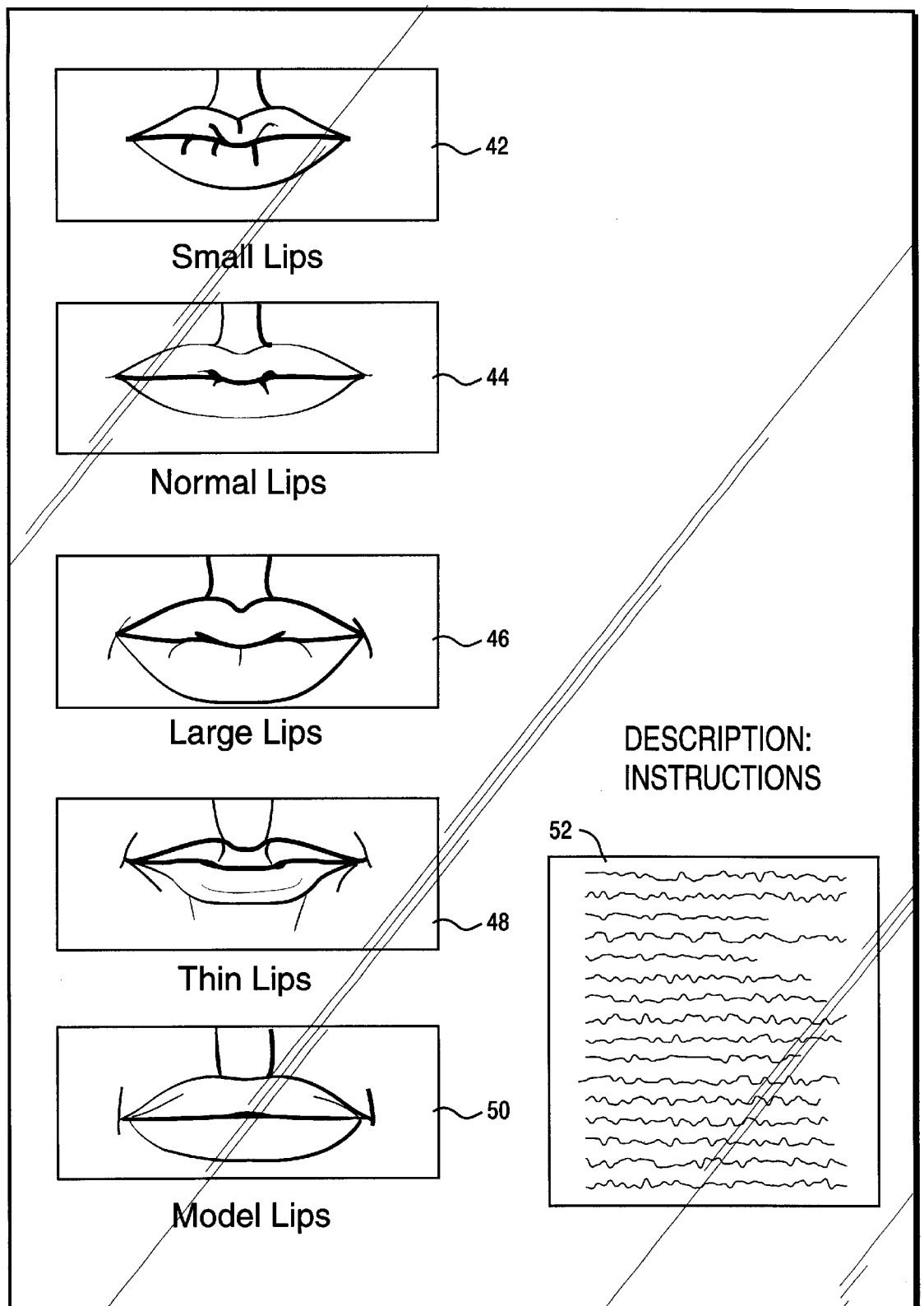
FIG. 4 is a plan view of a transparent overlay for four variations of the lips region.

FIG. 4 shows a similar overlay 13 for the lips region with printed lips images 42, 44, 46, 48 and 50 along with an exemplary instruction set 52. Similar overlays would be provided for the remaining facial regions.

It will be appreciated that the number of facial regions, and hence the number of component pieces may increase or decrease depending on the level of sophistication of the student or other user. More or fewer image variations for each region is also within the scope of the invention.

Figure 6:
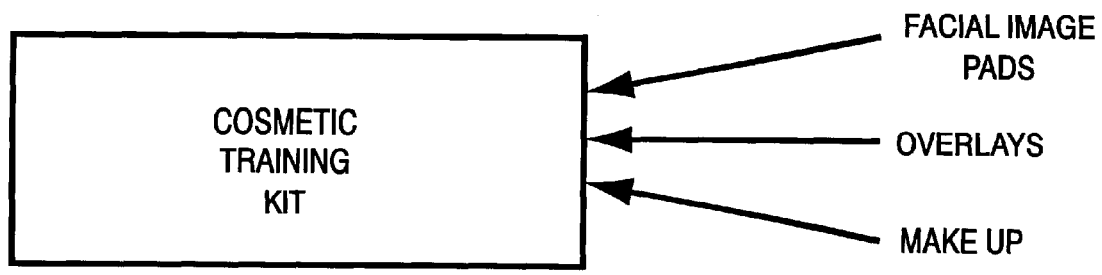
FIG. 6 is a schematic diagram of a kit in accordance with the invention.
Figure 3:
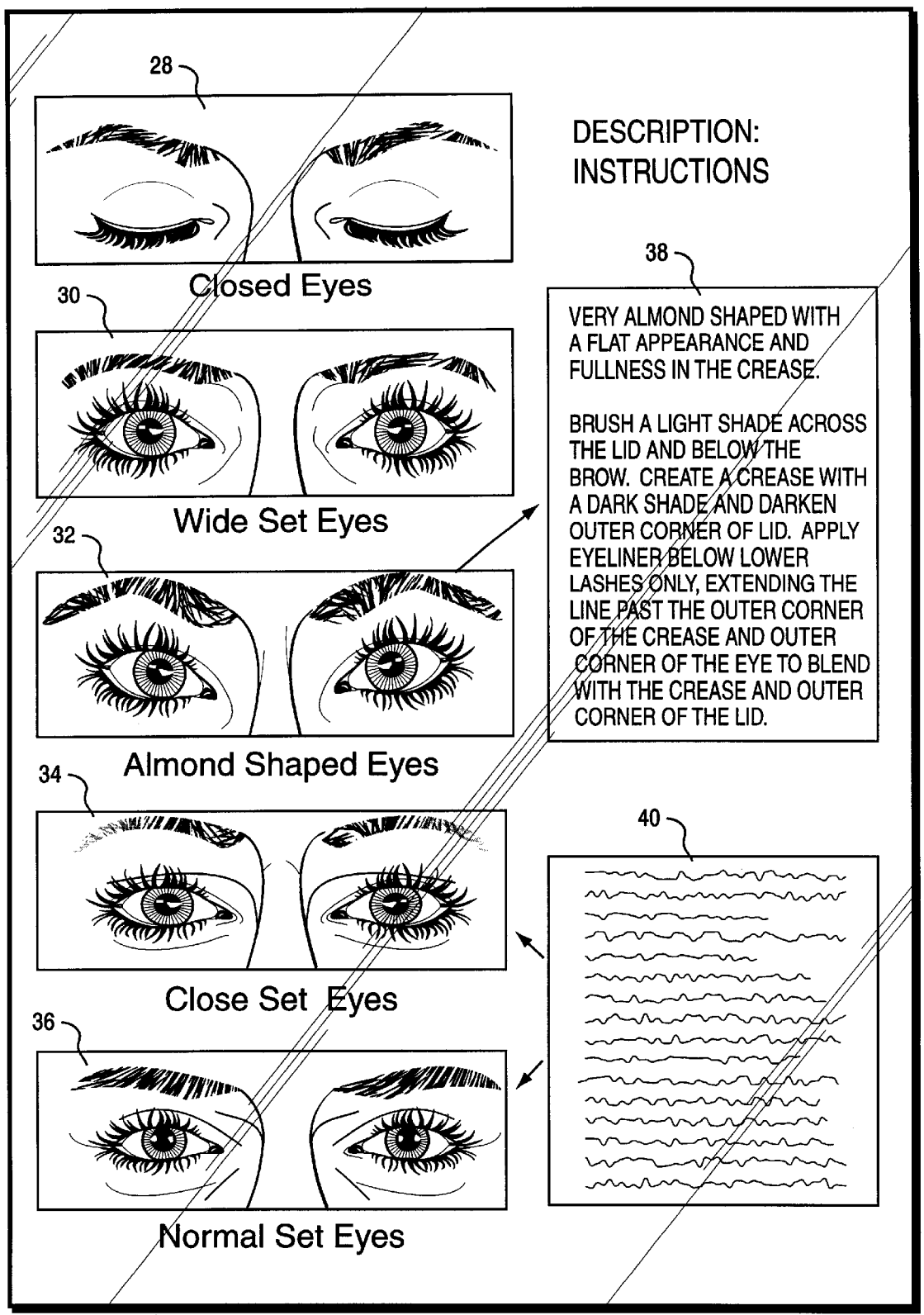
FIG. 3 is a plan view of a transparent overlay for five variations of the eye region.

In a particularly advantageous arrangement, the five rubber pads 10 and five overlays 12 are packaged with various make-up media (for example: 5 lipsticks; 2 eye pencils; 2 lip pencils; and several brushes, sponges and applicators or the like) in a kit 54 with suitable instructions. This is shown schematically in FIG. 6.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cosmetic application training system comprising:

a substrate having a facial image thereon, said facial image divided into multiple facial image regions; and one or more transparent overlays having outlines of said facial image regions including printed instructions for applying make-up to each of said facial image regions; wherein said substrate comprises a flexible foam rubber pad treated to permit application of the make-up to, and removal of the make-up from, said substrate.

2. A cosmetic application training system comprising:

at least two substrates having two differently shaped facial images thereon, each of said facial images divided into multiple facial regions and composed of discrete facial region pieces removable from each of said at least two substrates; wherein corresponding facial region pieces have identical peripheral shapes such that the facial region pieces of one of the substrates are interchangeable with the facial region pieces of the other of said substrates to thereby enable composition of variations of the two differently shaped facial images on each of said at least two substrates; and at least one transparent overlay having printed thereon outlines of one or more of the discrete facial region pieces and printed instructions for applying make-up to corresponding one or more of said discrete facial region pieces.

3. The system of claim 2 wherein said facial region pieces are provided for forehead, eyes, nose, lips and jaw line regions of each of said two differently shaped facial images.

4. The system of claim 2 wherein each of said facial images is digitally created on a computer and four-color screen printed onto said substrate.

5. The system of claim 2 wherein said substrate comprises a flexible foam rubber pad treated to permit application and removal of make-up.

6. The system of claim 2 wherein a transparent overlay is provided for each facial region.

7. The system of claim 6 wherein each said transparent overlay includes printed outlines of the variations of each facial region.

8. A cosmetic training kit comprising:
   a. a plurality of pads or substrates, each printed with a different facial image divided into facial regions; each of said facial regions incorporated on a removable facial region piece;
   b. a plurality of transparent overlays, each of said overlays having printed outlines of one facial region taken from said plurality of pads and instructions for applying makeup thereto; and
   c. a variety of makeup media.

* * * * *